United States Patent
Kim et al.

(10) Patent No.: US 7,135,132 B2
(45) Date of Patent: *Nov. 14, 2006

(54) PHOTOCHROMIC FLUORESCENT POLYMER AND PREPARATION METHOD THEREOF

(75) Inventors: Eunkyoung Kim, Daejeon (KR); Hyunil Cho, Kyungsangpook-do (KR)

(73) Assignee: Korea Research Institute Of Chemical Technology, Daejeon (KR)

( * ) Notice: Subject to any disclaimer, the term of this patent is extended or adjusted under 35 U.S.C. 154(b) by 411 days.

This patent is subject to a terminal disclaimer.

(21) Appl. No.: 10/424,108

(22) Filed: Apr. 28, 2003

(65) Prior Publication Data

US 2003/0213942 A1 Nov. 20, 2003

(30) Foreign Application Priority Data

Apr. 29, 2002 (KR) ............... 10-2002-0023450

(51) Int. Cl.
*G02B 5/23* (2006.01)
*C08F 136/16* (2006.01)
*F21V 9/00* (2006.01)

(52) U.S. Cl. ............... 252/582; 252/586; 526/291
(58) Field of Classification Search ............... 252/582, 252/586
See application file for complete search history.

(56) References Cited

U.S. PATENT DOCUMENTS 6,787,621 B1 * 9/2004 Kim et al. ............... 526/204
2003/0118924 A1 * 6/2003 Kim et al. ............... 430/19

OTHER PUBLICATIONS

H. Cho et al., Highly Fluorescent and Photochromic Diarylethene Oligomer Bridged by p-Phenylenevinylene, Macromolecules, 2002, 35, 8684-8687.*
E. Kim et al., Photoinduced Refractive Index Change of a Photochromic Diarylethene Polymer, Macromolecules, 1999, 32, 4855-4860.*
K. Uchida et al., Synthesis of Novel Photochromic Films by Oxidation Polymerization of Diarylethenes Containing Phenol Groups, Advanced Functional Materials, 13(10), Wiley InterScience (p. 755-762), Published Online Oct. 7, 2003.*
Irie, M., "Diarylethenes for Memories and Switches", Chem. Rev., vol. 100, No. 5, pp. 1685-1716, (2000).
Fernandez-Acebes, A. et al., "Optical Switching and Fluorescence Modulation in Photochromic Metal Complexes", Advanced Materials, vol. 10, No. 18, pp. 1519-1522, (1998).
Osuka, A. et al., "Synthesis and Photoisomerization of Dithienylethene-Bridged Diporphyrins", Journal of Organic Chemistry, vol. 66, No. 11, pp. 3913-3923, (2001).

* cited by examiner

*Primary Examiner*—Randy Gulakowski
*Assistant Examiner*—Timothy J. Kugel
(74) *Attorney, Agent, or Firm*—Finnegan, Henderson, Farabow, Garrett & Dunner LLP (57) ABSTRACT

The present invention relates to a photochromic fluorescent polymer and a preparation method thereof, and more particularly, to a photochromic fluorescent polymer having bonds between diarylethenes and aryethene-vinylene precursors with a weight average molecular weight of 500 to 1,000,000, which exhibits highly improved photochromic and fluorescent characteristics compared to conventional photochromic fluorescent materials and excellent solubility to organic solvents, thus being applicable for photofunctional materials and information processing device such as optical recording, optical switches, non-destructive optical recording materials.

10 Claims, 1 Drawing Sheet

PHOTOCHROMIC FLUORESCENT POLYMER AND PREPARATION METHOD THEREOF

FIELD OF THE INVENTION

The present invention relates to a photochromic fluorescent polymer and a preparation method thereof, and more particularly, to a photochromic fluorescent polymer having bonds between diarylethenes and aryethene-vinylenes with a weight average molecular weight of 500 to 1,000,000, which exhibits highly improved photochromic and fluorescent characteristics compared to conventional photochromic fluorescent materials and excellent solubility to organic solvents, thus being applicable for photofunctional materials and information processing device such as optical recording, optical switches, non-destructive optical recording materials.

BACKGROUND OF THE INVENTION

Photochromic materials change colors reversibly with irradiation of light and suitable for various applications such as optical recordings, optical switches, modulators, and the like. Investigations have been performed to develop novel photochromic materials which are applicable for optical information recoding medium capable of reproducing information signals or recording and reproducing information signals by using light beams.

Irie et al. have reported processes for preparing photochromic diarylethene compounds, which have excellent photochromic property and durability, and their uses (Masahiro Irie, *Chem. Rev.*, 2000, 100(5), 1685–1716). However, these photochromic diarylethene compounds have a drawback such as gradual erasing of the record due to poor fluorescent property.

In order to be free from the above problem, Lehn et al. have developed dithienylethene-tungsten compounds having fluorescent property (Fernandez Acebes A, Lehn J. M., *Advanced Materials*, V.10 N.18, 1519, 1998). However, it has another drawback that a short wavelength of 240 nm has to be irradiated to these compounds to exhibit fluorescence. In other words, it requires high energy.

Irie et al. have also developed fluorescent diarylethenes substituted with diporphyrin or triphenylimidazole (*Journal of Organic Chemistry*, V.66 N.16, 5419–5423; V.66 N. 11, 3913–3923, 2001). However, these compounds has poor photochromic property and low solubility, thus being inapplicable for manufacturing thin film thereof.

SUMMARY OF THE INVENTION

To solve the above problems, the inventors of the present invention developed a photochromic fluorescent polymer having bonds between diarylethene and arylene-vinylele which provides excellent photochromic and fluorescent properties and can be also applicable to manufacture thin film comprising the same. Further, the photochromic fluorescent polymer has excellent solubility in organic solvents which is an advantage to easily manufacture thin film and the thin film manufactured using the same also has excellent photochromic and fluorescent properties.

Accordingly, an object of the present invention is to provide a photochromic fluorescent polymer having bonds between diarylethene and arylene-vinylene which provides highly improved photochromic and fluorescent properties compared to the conventional photochromic fluorescent materials as well as superior solubility, thus easily applicable for the formation of thin films having the maintained photochromic and fluorescent properties. Another object of the present invention is to provide a method for preparing the photochromic fluorescent polymer.

BRIEF DESCRIPTION OF THE DRAWINGS

The above and other objects and features of the present invention will become apparent from the following description of the invention, when taken in conjunction with the accompanying drawing, in which.

DETAILED DESCRIPTION OF THE INVENTION

The present invention is to provide a photochromic fluorescent polymer expressed by the following formula (1), wherein $R^1$ and $R^2$ represent CN or $R^1C=CR^2$ chosen from where a broken line represents a bond to arylgroups;

$R^3$ to $R^{[[4]]b}$ represent a hydrogen atom, $C_1$–$C_{10}$ alkyl or benzene and wherein n is an integer greater than 0;

$Ar^1$ and $Ar^2$ are the same or different, independently represent where Y and Z represent O, S, N—$CH_3$ and a broken line represents a bond and a broken line with E represents a bond to the above formula (1); and

Ar³ represents where a broken line represents a bond; and R⁷ to R⁹ represent substituents at least one chosen from a hydrogen atom, benzene, an alkyl having not more than carbon atoms of 20, an alkylester having not more than carbon atoms of 20, and an alkoxy group having not more than carbon atoms of 20, trialkylsilyl group, or alkyleneoxy such as —(O—CH₂CH₂—O)— groups.

The photochromic fluorescent polymer of the present invention has a weight average molecular weight in the range of from 500 to 1,000,000. This photochromic fluorescent polymer may be prepared by reacting a compound of formula (2) and a compound of formula (3) in a ratio of 0.5:2 to 2:0.5 or by reacting a compound of formula (4) and a compound of formula (5) in a ratio of 0.5:2 to 2:0.5,

(2)

(3)

(4)

HOC—Ar³—COH (5)

wherein R¹ and R² represent CN or R¹C=CR² chosen from where a broken line represents a bond to aryl groups;

R³ to R⁶ represent a hydrogen atom, $C_1$–$C_{10}$ alkyl or benzene;
Ar¹ and Ar² represent independently where Y and Z represent O, S, N—CH₃ and a broken line represents a bond and a broken line with E represents a bond to the above formula (1); and Ar³ represents where a broken line represents a bond; and R⁷ to R⁹ represent substituents at least one chosen from a hydrogen atom, benzene, an alkyl having not more than carbon atoms of 20, an alkylester having not more than carbon atoms of 20, and an alkoxy group having not more than carbon atoms of 20, trialkylsilyl group, or alkyleneoxy such as —(O—CH₂CH₂O)— groups;

Ar⁴ and Ar⁵ represent substituted or unsubstituted benzene; and

X represents Cl, Br, or I.

The compounds of formulas (2)–(5) may be prepared by known methods in Parrinello, G.; Stille, J. K. *J. Am. Chem. Soc.* 1987, 109, 7122, Osuka, A.; Fujikane, D.; Shinmeri, H.; Kobatake, S.; Irie, M. *J. Org. Chem.* 2001, 66, 3913 or the like. The photochromic fluorescent polymer of formula (1) was prepared by reacting the compound (2) and the compound (3) or by reacting the compound (4) and the compound (5) at a temperature of 0 to 150° C. for 30 min to 14 days, preferably at 25 to 60° C. for 48 to 72 hours. If the reaction temperature is lower than 0° C., yield becomes low. On the other hand, if it is higher than 150° C., products produced become decomposed. Further, if the reaction is performed less than 30 min, yield becomes low. If it was performed more than 14 days, insoluble byproducts were produced.

The reaction is performed in a solvent at least one chosen from chloroform, tetrahydrofuran, N-methylpyrrolidone, methyl sulfoxide, N,N-dimethylacetamide, 1,4-dioxane, ethyl alcohol, methyl alcohol, benzene, ethylene glycol dimethyl ether, and acetonitrile.

The reaction is performed in the presence of a catalyst at least one chosen from sodium methoxide, sodium ethoxide, potassium ethoxide, potassium t-butoxide, sodium hydride, lithium iodide, lithium bromide, lithium chloride, n-butyl lithium, and phenyl lithium.

Further, the photochromic fluorescent polymer of the present invention is used to produce photochromic fluorescent thin film having excellent photochromic characteristics and fluorescent characteristics.

The photochromic fluorescent thin film may be prepared by depositing the photochromic fluorescent polymer by using a depositer. The photochromic fluorescent thin film may be also prepared by dissolving 0.001 to 80 parts by weight of the photochromic fluorescent polymer in 20 to 99.99 parts by weight of an organic solvent, and then coating the solution chosen from spin-coating, spray, bar-coating, dip-coating and screen-printing, and finally removing the organic solvent. Other additives, used by one having ordinary skilled in the art, such as a polymer resin such as polymethylmethacrylate, polycarbonate, polyolefin, polysulfon, and the like, an antioxidant, a thickener, wax and an antistatic agent may be arbitrarily incorporated to improve functionality of the solution or physical properties of the thin film.

Examples of the additives are as follows: polyvinyl chloride resin, polyvinyl acetate resin, vinyl chloride-vinyl acetate copolymer, polystyrene resin, styrene copolymer, phenoxy resin, polyester resin, aromatic polyester resin, polyurethane resin, polycarbonate resin, polyacrylate resin, polymethacrylate resin, acrylate copolymer, maleic anhydride copolymer, polyvinyl alcohol resin, modified polyvinyl alcohol resin, hydroxyethyl cellulose resin, carboxymethyl cellulose resin, starch, methanol, ethanol, isopropanol, n-butanol, and methylisocarbinol; acetone, 2-butanone, ethylamyl ketone, diacetone alcohol, isophorone, and cyclohexanone; N,N-dimethylformamide, and N,N-dimethylacetamide; diethyl ether, diisopropyl ether, tetrahydrofuran, 1,4-dioxane, and 3,4-dihydro-2H-pyran; 2-methoxy ethanol, 2-ethoxy ethanol, 2-butoxy ethanol, and ethylene glycol dimethyl ether; methyl acetate, ethyl acetate, isobutyl acetate, amyl acetate, ethyl lactate, and ethylene carbonate; benzene, toluene, and xylene; aliphatic hydrocarbon such as hexane, heptane, isooctane and cyclohexane; methylene chloride, 1,2-dichloroethane, dichloropropane, and chlorobenzene; dimethyl sulfoxide; N-methyl-2pyrrolidone and N-octyl-2-pyrrolidone, an antioxidant, a thickener, wax, an antistatic agent and the like.

The photochromic fluorescent polymer of the present invention can be applied to a variety of fields including optical recording mediums such as CD, DVD, holography recording media, and smart card; display elements such as display sheets, fluorescent sheets, TV and computer monitors; lenses; bio-sensor, biochip, and photochromic fibers.

The following Examples are intended to further illustrate the present invention without limiting its scope. The materials used in the following Examples such as a compound, a basic catalyst and a solvent were either synthesized by employing a method known to a skilled one in the art or purchased from Aldrich Co., or Tokyo Kasei Co., etc.

The properties were evaluated by the following methods:

[Test Method]

(1) Photochromic property (coloring and bleaching behavior): the sample was placed in the UV/Vis spectrometer and the absorption at the maximum wavelength ($\lambda_{max}$) of the polymer was monitored. The change of absorption as a function of irradiation time was applied to the following equation (References: A. Mejiritski, A. Y. Polykarpov, A. M. Sarker and D. C. Neckkers. *J. Photochem. Photobiol.* 1997, 108, 289; U. K. Kim et al., *Chemical Physics Letters*, 2000, 328(1–2), 234–243).

Photochromic property=100×($n/N$)

(2) Fluorescence quantum Yield: an intensity of fluorescence determined by fluorescence spectrometer and fluorescence quantum yield of a control solution, quinone sulfate solution (1N $H_2SO_4$), were applied to the following equation to determine the fluorescence quantum yield of the polymer (J. N. Demas and G. A. Crosby. *J. Phys. Chem.* 75 (1971), p.991. Ng S. C. , Ma Y. F., Chan H. S. O., Dou Z. L. *Synthetic Metals*, V.100 N.3, 269–277, 1999), $$\text{Fluorescence Quantum Yield (\%)} = \left[\frac{F_s}{F_r}\right]\left[\frac{A_r}{A_s}\right]\varnothing_r \times 100$$

wherein $F_s$ is a fluorescence intensity of a sample; $F_r$ is a fluorescence intensity of a control sample, quinone sulfate solution; $A_s$ is an absorbance of a sample; $A_r$ is an absorbance of a control sample n; and $\Phi_r$ is a fluorescence quantum yield of a control sample (quinone sulfate 1N $H_2SO_4$=0.546).

EXAMPLE 1

Preparation of Photochromic Fluorescent Polymer

A compound of formula (1) of the present invention, especially a structure (1), was prepared by the following procedure as in Scheme 1.

Scheme 1

Structure 2

Structure 3 t-BuOK
EtOH/CHCl₃

-continued

Structure 1

To chloroform were dissolved 1.4 g of diarylethylene substituted with formyl group of structure 2 and 2.1 g of the compound of structure 3. Potassium t-butoxide (1.5 g) was dissolved in 40 mL of ethanol. The ethanol solution was slowly added to the chloroform solution while stirring and the mixture was reacted at 25° C. for 24 hours. After removing chloroform, the reaction products were washed with excess of methanol to give the desired polymer. Yield was 80% and a weight average molecular weight was 2120. $^1$HNMR (CDCl$_3$, ppm) δ 2.2, 2.5, 6.6, 7.1–7.6.

EXPERIMENTAL EXAMPLE

Photochromic Analysis and Fluorescence Analysis

Figure 1:
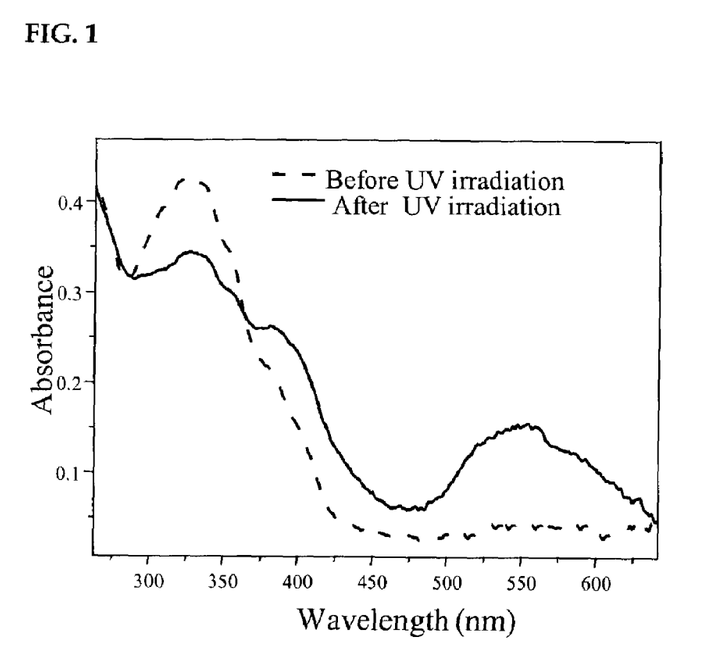
FIG. 1 represents absorption spectra of the obtained polymer in Example 1 before and after the irradiation of ultraviolet light.

The solution was prepared by dissolving the polymer prepared in Example 1 in chloroform to give a concentration of 10 μM. An ultraviolet light was irradiated to the chloroform solution in the spectrophotometer and result was represented in FIG. 1. A short wavelength of 290 nm in wavelength was irradiated to the chloroform solution in the fluorescence spectrometer and result was represented in FIG. 2.

When an ultraviolet light was irradiated to the polymer prepared in Example 1 of the present invention, the solution containing the polymer turned its color to red. In other words, it was proved that the polymer had photochromic property. As shown in absorption spectra of FIG. 1, new absorption band was produced in the range of the visible region and the polymer had a quantum yield of 40% derived from absorbance change as a function of irradiation time.

Further, it was noted that the polymer prepared in Example 1 of the present invention had fluorescence property and a fluorescence quantum yield of 53% at a low energy of 290 nm in wavelength.

COMPARATIVE EXPERIMENTAL EXAMPLE

Photochromic Analysis and Fluorescence Analysis

The photochromic analysis and fluorescence analysis were performed as in Experimental Example 1, excepting that 1,2-bis(2-methylbenzo[b]thiophene-3-yl)hexafluorocyclopentene was used instead of the polymer prepared in Example 1.

Figure 2:
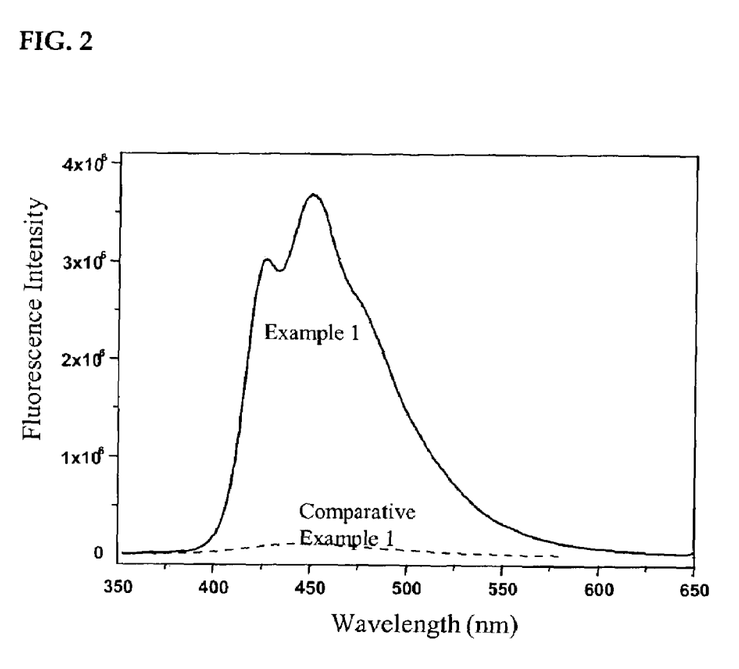
FIG. 2 represents fluorescence spectra of (a) the obtained polymer in Example 1 and (b) 1,2-bis(2-methylbenzo[b]thiophene-3-yl)hexafluorocyclopentene.

It was noted that the compound had a quantum yield was 11% and a fluorescence quantum yield of 3% as shown in FIG. 2.

EXAMPLES 2 TO 10

Preparation of Photochromic Fluorescent Polymer

Experiments were performed the same as in Example 1, excepting that a reactant, catalyst, solvent and content, temperature, and reaction time were modified as shown in Table 1 to provide the following photochromic fluorescent polymers.

TABLE 1

| | | Examples | | | | | | | | | | |
|---|---|---|---|---|---|---|---|---|---|---|---|---|
| Category | | 1 | 2 | 3 | 4 | 5 | 6 | 7 | 8 | 9 | 10 | 11 |
| Reactant (g) | Structure 2[1] | 1.4 | | | | | | | | | | |
| | Structure 3[2] | 2.1 | | | | | | | | | | 3.7 |
| | Structure 4[3] | | 2 | | | | | | | | 2 | |
| | Structure 5[4] | | | 1 | | | | | | | | |
| | Structure 6[5] | | | | 1.2 | | | | | | | |
| | Structure 7[6] | | | | | 1 | | | | | | |
| | Structure 8[7] | | | | | | 1 | | | | | |
| | Structure 9[8] | | | | | | | 1 | | | | |
| | Structure 10[9] | | 1.5 | | | | | | | | | |
| | Structure 11[10] | | | 1.5 | | | 1.5 | | | | | |
| | Structure 12[11] | | | | 1.1 | | | | | | | |
| | Structure 13[12] | | | | | | | 1.5 | | | | |
| | Structure 14[13] | | | | | | | | 1.5 | | 1.5 | |
| | Structure 15[14] | | | | | | | | | 1.5 | | |
| | Structure 16[15] | | | | | 1.5 | | | | | | |
| | Structure 17[16] | | | | | | | | | | | 2 |

TABLE 1-continued

| | Category | \multicolumn{11}{c}{Examples} |
| | | 1 | 2 | 3 | 4 | 5 | 6 | 7 | 8 | 9 | 10 | 11 |
|---|---|---|---|---|---|---|---|---|---|---|---|---|
| Solvent (mL) | Chloroform | 20 | 20 | | | | 20 | | 20 | 20 | 20 | 50 |
| | Benzene | | | 10 | 10 | 10 | | | | | | |
| | Acetonitrile | | | | | | | 10 | | | | |
| Cat. (g)/EtOH (mL) | Potassium-t-butoxide | 1.5/40 | 1.75//40 | | 1.75/40 | 1.75/40 | 1.75/40 | | 1.75/40 | 1.75/40 | 1.75//40 | 2.6/80 |
| | Sodiumethoxide | | | 1.75//40 | | | | 1.75//40 | | | | |
| Polymerization temperature (° C.) | | 25 | 25 | 25 | 40 | 25 | 25 | 25 | 25 | 25 | 25 | 20 |
| Reaction time (hour) | | 24 | 65 | 25 | 48 | 65 | 65 | 65 | 72 | 65 | 72 | 84 |
| Yield (%) | | 80 | 55 | 65 | 40 | 60 | 35 | 55 | 75 | 85 | 65 | 70 |

1. Structure 2

2. Structure 3

3. Structure 4

4. Structure 5

5. Structure 6

6. Structure 7

7. Structure 8

TABLE 1-continued

| | Examples | | | | | | | | | | |
|---|---|---|---|---|---|---|---|---|---|---|---|
| Category | 1 | 2 | 3 | 4 | 5 | 6 | 7 | 8 | 9 | 10 | 11 |

8. Structure 9

9. Structure 10

10. Structure 11

11. Structure 12

12. Structure 13

13. Structure 14

14. Structure 15

15. Structure 16

16. Structure 17

EXAMPLE 12

Preparation of Photochromic Fluorescent Thin Film

The photochromic fluorescent polymer (1 g) obtained in Example 1 was dissolved in chloroform (10 mL). The mixture solution was spin-coated on the surface of quartz, followed by drying in the vacuum oven at 80° C. for 2 hours to produce a transparent thin film having a thickness of 500 nm.

An ultraviolet light was irradiated to the obtained transparent thin film to observe fluorescence thereof. It was confirmed that the thin film has fluorescence by showing the highest peak at 470 nm in wavelength.

As describe in the above, the photochromic fluorescent polymer of the present invention exhibits highly improved photochromic property up to 30 to 40% and fluorescence property up to 10 to 50%, compared to the conventional polymers. Since the polymer of the present invention has excellent solubility, it is easily and effectively applied to produce the thin film having remained excellent photochromic and fluorescent properties. Further, the polymer of the present invention can be suitable for photofunctional materials and information processing device such as optical recording, optical switches, non-destructive optical recording materials.

What is claimed is:

1. A photochromic fluorescent polymer expressed by the following formula (1), wherein $R^1$ and $R^2$ represent CN or $R^1C$=$CR^2$ chosen from where a broken line represents a bond to arylgroups;
$R^3$ to $R^6$ represent a hydrogen atom, $C_1$–$C_{10}$ alkyl or benzene and wherein n is an integer greater than 0;
$Ar^1$ and $Ar^2$ are the same or different, independently represent where Y and Z represent O, S, N—$CH_3$ and a broken line represents a bond and a broken line with E represents a bond to the above formula (1); and
$Ar^3$ represents where a broken line represents a bond; and $R^7$ to $R^9$ represent substituents at least one chosen from a hydrogen atom, benzene, an alkyl having not more than carbon atoms of 20, an alkylester having not more than carbon atoms of 20, and an alkoxy group having not more than carbon atoms of 20, trialkylsilyl group, or alkyleneoxy such as —(O—$CH_2CH_2$—O)— groups.

2. The photochromic fluorescent polymer according to claim 1, wherein said polymer has a weight average molecular weight of 500 to 1,000,000.

3. A process for preparing the photochromic fluorescent polymer of claim 1 by reacting a compound of formula (2) and a compound of formula (3) in a ratio of 0.5:2 to 2:0.5, (2)

(3)

wherein $R^1$ and $R^2$ represent CN or $R^1C$=$CR^2$ chosen from where a broken line represents a bond to aryigroups;
$R^3$ to $R^6$ represent a hydrogen atom, $C_1$–$C_{10}$ alkyl or benzene and wherein n is an integer greater than 0;
$Ar^1$ and $Ar^2$ are the same or different, independently represent where Y and Z represent O, S, N—OH₃ and a broken line represents a bond and a broken line with E represents a bond to the above formula (2); and Ar³ represents where a broken line represents a bond; and R⁷ to R⁹ represent substituents at least one chosen from a hydrogen atom, benzene, an alkyl having not more than carbon atoms of 20, an alkylester having not more than carbon atoms of 20, and an alkoxy group having not more than carbon atoms of 20, trialkylsilyl group, or alkyleneoxy such as —(O—CH₂CH₂—O)— groups;

Ar4 and Ar5 represent substituted or unsubstituted benzene; and

X represents Cl, Br, or I.

4. The process for preparing the photochromic fluorescent polymer according to claim 3, wherein said reaction is performed at a temperature of 0 to 150° C. for 30 minutes to 14 days.

5. The process for preparing the photochromic fluorescent polymer according to claim 3, wherein said reaction is performed in a solvent at least one chosen from chloroform, tetrahydrofuran, N-methylpyrrolidone, methylsulfoxide, N, N- dimethylacetamide, 1 ,4-dioxane, ethylalcohol, methylalcohol, benzene, ethylene glycol dimehtyl ether, an acetonitrile.

6. The process for preparing the photochromic fluorescent polymer according to claim 3, wherein said reaction is performed in the presence of catalyst at least one chosen from sodium methoxide, sodium ethoxide, potassium ethoxide, potassium t-butoxide, sodium hydride, lithium iodide, lithium bromide, lithium chloride, n- butyl lithium, and phenyl lithium.

7. A process for preparing the photochromic fluorescent polymer of claim 1 by reacting a compound of formula (4) and a compound of formula (5) in a ratio of 0.5:2 to 2:0.5,

(4)

X(Ar⁵)₃P—CH(R³)—CH(R⁴)—Ar¹    Ar²—CH(R⁵)—CH(R⁶)—P(Ar⁴)₃X

HOC—Ar³—COH (5)

wherein R¹ and R² represent CN or R¹C=CR² chosen where a broken line represents a bond to arylgroups;

R³ to R⁶ represent a hydrogen atom, $C_1$-$C_{10}$ alkyl or benzene and wherein n is an integer greater than 0;

Ar¹ and Ar² are the same or different, independently represent where Y and Z represent O, S, N—CH₃ and a broken line represents a bond and a broken line with E represents a bond to the above formula (4); and Ar³ represents where a broken line represents a bond; and R7 to R9 represent substituents at least one chosen from a hydrogen atom, benzene, an alkyl having not more than carbon atoms of 20, an alkylester having not more than carbon atoms of 20, and an alkoxy group having not more than carbon atoms of 20, trialkylsilyl group, or alkyleneoxy such as —(O—CH₂CH₂—O)— groups;

Ar⁴ and Ar⁵ represent substituted or unsubstituted benzene; and X represents Cl, Br, or I.

8. The process for preparing the photochromic fluorescent polymer according to claim 7, wherein said reaction is performed at a temperature of 0 to 150° C. for 30 minutes to 14 days.

9. The process for preparing the photochromic fluorescent polymer according to claim 7, wherein said reaction is performed in a solvent at least one chosen from chloroform, tetrahydrofuran, N-methylpyrrolidone, methylsulfoxide, N, N- dimethylacetamide, 1,4-dioxane, ethylalcohol, methylalcohol, benzene, ethylene glycol dimehtyl ether, and acetonitrile.

10. The process for preparing the photochromic fluorescent polymer according to claim 7, wherein said reaction is performed in the presence of catalyst at least one chosen from sodium methoxide, sodium ethoxide, potassium ethoxide, potassium t-butoxide, sodium hydride, lithium iodide, lithium bromide, lithium chloride, n- butyl lithium, and phenyl lithium.

* * * * *

UNITED STATES PATENT AND TRADEMARK OFFICE
CERTIFICATE OF CORRECTION

| | | |
|---|---|---|
| PATENT NO. | : 7,135,132 B2 | |
| APPLICATION NO. | : 10/424108 | |
| DATED | : November 14, 2006 | |
| INVENTOR(S) | : Eunkyoung Kim and Hyunil Cho | |

It is certified that error appears in the above-identified patent and that said Letters Patent is hereby corrected as shown below:

On the title page, item (57), line 4, "aryethene-vinylene" should read --arylethene-vinylene--.

In claim 3, column 14, lines 29-32,

"  "

should read

--  --.

In claim 3, column 14, line 55, "aryigroups;" should read --arylgroups;--.

In claim 3, column 15, line 1, "0, S, N-OH$_3$" should read --O, S, N-CH$_3$--.

In claim 3, column 15, line 11, "or" should read --, or--.

In claim 3, column 15, line 32, "Ar4 and Ar5" should read --Ar$^4$ and Ar$^5$--.

In claim 5, column 15, lines 43-44, "N, N- dimethylacetamide, 1 ,4-dioxane," should read --N,N-dimethylacetamide, 1,4-dioxane,--.

In claim 5, column 15, line 45, "dimehtyl ether, an" should read --dimethyl ether, and--.

In claim 6, column 15, line 52, "n- butyl" should read --n-butyl--.

In claim 7, column 15, line 67, after "chosen" insert --from--.

UNITED STATES PATENT AND TRADEMARK OFFICE
CERTIFICATE OF CORRECTION

PATENT NO. : 7,135,132 B2
APPLICATION NO. : 10/424108
DATED : November 14, 2006
INVENTOR(S) : Eunkyoung Kim and Hyunil Cho It is certified that error appears in the above-identified patent and that said Letters Patent is hereby corrected as shown below:

In claim 7, column 16, lines 24-28, should read

In claim 7, column 16, line 31, "0," should read --O,--.

In claim 7, column 16, line 40, "or" should read --, or--.

In claim 7, column 16, line 56, "R7 to R9" should read --$R^7$ to $R^9$--.

In claim 9, column 17, lines 6-7, "N, N- dimethylacetamide, 1 ,4-dioxane," should read --N,N-dimethylacetamide, 1,4-dioxane,--.

In claim 9, column 17, line 8, "dimehtyl" should read --dimethyl--.

In claim 10, column 18, line 6, "n- butyl" should read --n-butyl--.

Signed and Sealed this

Seventeenth Day of April, 2007

JON W. DUDAS
*Director of the United States Patent and Trademark Office*